(12) United States Patent
Parsania

(10) Patent No.: US 11,815,032 B2
(45) Date of Patent: Nov. 14, 2023

(54) CONTROLLER AND METHOD

(71) Applicant: Siemens Energy Global GmbH & Co. KG, Munich (DE)

(72) Inventor: Nishant Parsania, North Hykeham (GB)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 574 days.

(21) Appl. No.: 16/644,803

(22) PCT Filed: Sep. 12, 2018

(86) PCT No.: PCT/EP2018/074613
§ 371 (c)(1),
(2) Date: Mar. 5, 2020

(87) PCT Pub. No.: WO2019/053063
PCT Pub. Date: Mar. 21, 2019

(65) Prior Publication Data
US 2021/0108577 A1  Apr. 15, 2021

(30) Foreign Application Priority Data
Sep. 18, 2017  (EP) .................................. 17191559

(51) Int. Cl.
*F02C 9/28* (2006.01)
*F23N 5/18* (2006.01)
(Continued)

(52) U.S. Cl.
CPC .................. *F02C 9/28* (2013.01); *F23N 5/18* (2013.01); *F23N 5/265* (2013.01); *F23R 3/343* (2013.01); *F05D 2220/32* (2013.01); *F05D 2270/08* (2013.01); *F05D 2270/303* (2013.01); *F05D 2270/331* (2013.01); *F05D 2270/44* (2013.01)

(58) Field of Classification Search
None
See application file for complete search history.

(56) References Cited

U.S. PATENT DOCUMENTS 4,716,719 A * 1/1988 Takahashi ................. F23R 3/34
60/773
5,272,637 A * 12/1993 Urushidani ............... F02C 9/32
701/100

(Continued)

FOREIGN PATENT DOCUMENTS

CN 101021182 A 8/2007
CN 102725498 A 10/2012
(Continued)

OTHER PUBLICATIONS

International search report and written opinion dated Nov. 14, 2018, for corresponding PCT/EP2018/074613.

*Primary Examiner* — Jason H Duger

(57) ABSTRACT

A controller for a gas turbine arranged to supply a load is described. The gas turbine includes a fuel supply arranged to supply fuel at a fuel flow rate to a combustor. The fuel supply includes a first fuel supply and a second fuel supply. The controller is arranged to control a proportion of the fuel flow rate supplied via the first fuel supply based, at least in part, on the fuel flow rate. A gas turbine includes such a controller and a method controls such a gas turbine.

24 Claims, 6 Drawing Sheets

(51) Int. Cl.
*F23N 5/26* (2006.01)
*F23R 3/34* (2006.01)

(56) References Cited

U.S. PATENT DOCUMENTS

| | | |
|---|---|---|
| 5,339,635 A | 8/1994 | Iwai et al. |
| 5,361,576 A | 11/1994 | Gerhard |
| 7,640,725 B2 | 1/2010 | Bland et al. |
| 8,959,925 B2 | 2/2015 | Romig et al. |
| 9,086,219 B2 | 7/2015 | Deuker et al. |
| 2011/0265487 A1* | 11/2011 | Gauthier .................. F02C 9/28 60/773 |
| 2011/0270503 A1 | 11/2011 | Stuttaford et al. |
| 2014/0230449 A1* | 8/2014 | Saito ........................ F02C 9/50 60/734 |
| 2015/0059353 A1 | 3/2015 | Asai et al. |
| 2017/0122222 A1 | 5/2017 | Punjala et al. |

FOREIGN PATENT DOCUMENTS

| | | |
|---|---|---|
| EP | 0198502 A1 | 10/1986 |
| EP | 1533573 A1 | 5/2005 |
| EP | 2442031 A1 | 4/2012 |
| EP | 2829805 A1 | 1/2015 |
| GB | 2484957 A | 5/2012 |
| RU | 2413083 C2 | 2/2011 |
| RU | 2614471 C2 | 3/2017 |
| WO | 2015071079 A1 | 5/2015 |

* cited by examiner

CONTROLLER AND METHOD

CROSS REFERENCE TO RELATED APPLICATIONS

This application is the US National Stage of International Application No. PCT/EP2018/074613 filed 12 Sep. 2018, and claims the benefit thereof. The International Application claims the benefit of European Application No. EP17191559 filed 18 Sep. 2017. All of the applications are incorporated by reference herein in their entirety.

FIELD OF INVENTION

The present invention relates generally to controllers for gas turbines, to gas turbines comprising such controllers and to methods of controlling such gas turbines.

BACKGROUND TO THE INVENTION

An example of a typical gas turbine arrangement is shown in FIG. 1. The gas turbine comprises an air inlet 10 at one end followed by a compressor stage 11 in which incoming air is compressed for application to one or more combustors 12, which are distributed circumferentially around the turbine axis 13. Fuel is introduced into the combustors at 14 and is there mixed with a part of the compressed air leaving the compressor stage 11. Hot gases created by combustion in the combustors are directed to a set of turbine blades 15, being guided in the process by a set of guide vanes 16, and the turbine blades 15 and the shaft forming the axis 13 are turned as a result. The turbine blades 15 in turn rotate the blades of the compressor stage 11, so that the compressed air is supplied by the gas turbine itself once this is in operation.

Part of a typical combustor is shown in FIG. 2A. FIG. 2B shows a section along a line III-III shown in FIG. 2A. The combustor is in four parts: a front-end part 20, a swirler part 21, a burner prechamber part 22 and a combustion volume 23. Main fuel is introduced into the swirler 21 by way of the front-end part 20 through a conduit 24, while pilot fuel enters the burner space through a conduit 25 having at its end a pilot-fuel nozzle 29. The main and pilot fuel-flows are derived from a fuel-split valve 26, which is fed with a fuel supply 27 representing the total fuel supply to the combustor. The main fuel flow enters the swirler through a set of main-fuel nozzles (or injector) 28, from where it is guided along swirler vanes 30, being mixed with incoming compressed air in the process. The fuel may be gaseous fuel or liquid fuel. The resulting air/fuel mixture maintains a burner flame. The hot air from this flame enters the combustion volume 23. A gas turbine will often comprise a number of such combustors, in which case the main and pilot fuel-flow distribution will usually be as shown in FIG. 3.

Due to environmental concerns, there is a continued drive to reduce pollutant emissions from gas turbines. Potential pollutant emissions include oxides of nitrogen (NO and $NO_2$, generally referred to as NOx), carbon monoxide (CO), unburned hydrocarbons (UHCs, typically expressed as equivalent methane), oxides of sulphur ($SO_2$ and $SO_3$) and particulate matter (PM). UHCs typically include volatile organic compounds (VOCs), which contribute to the formation of ground level atmospheric ozone, in addition to compounds such as methane and ethane, that do not contribute to ozone formation. The amounts of $SO_2$, UHC and PM are usually considered negligible when burning natural gas. However, NOx and potentially CO emissions may be of significance when combusting natural gas and/or fuel oil in gas turbines.

An amount of NOx produced depends on combustion temperature and/or fuel to air ratio. When combustion takes place at lower temperatures and/or at lower fuel to air ratios, the NOx emissions are reduced. Conventional methods of reducing NOx emissions include Wet Low Emission (WLE), in which water or steam injection reduces the fuel to air ratios, and Dry Low Emission (DLE) and Dry Low NOx (DLN), which use principles of lean premixed combustion. DLE may reduce NOx and CO emissions to less than 25 ppmv or even to less than 10 ppmv while DLN may reduce NOx emissions to less than 25 ppmv.

FIG. 4 shows a graph of a Pilot Pressure Drop across a pilot nozzle as a function of ambient temperature for different loads L of 80%, 90% and 100% for a typical gas turbine, normalised for an ambient temperature of 50° C. and a load L of 80%.

Generally, ambient condition variation, for example ambient temperature, pressure and/or humidity, may cause variations in combustor entry pressure, temperature and/or mass flow. For gas turbines, combustor exit temperatures TX and/or turbine inlet temperatures TI (also known as TFIRE) may be limited to a maximum and/or a constant value, such that power output from the gas turbines varies due to the ambient condition variation. It is known to control a fuel percentage from various fuel circuits, for example the main and/or pilot fuel-flows, as a function of TFIRE. For example, by controlling an amount of pilot fuel, a localized temperature of hot gases or products may be controlled and NOx emissions may be reduced.

Generally, the gas turbines operate at wide ranges of ambient temperatures from about −40° C. to about +50° C. (i.e. from about 233 K to about 323 K). At relatively colder temperatures, for example below 0° C. (i.e. below 273 K), relatively higher densities and hence mass flow rates of air result in relatively higher power outputs from the gas turbines, compares with relatively higher temperatures.

As shown in FIG. 4, the pilot pressure drop generally decreases as the ambient temperature increases, for the different loads L of 80%, 90% and 100%. Furthermore, the pilot pressure drop increases as the load L increases, for the different loads L of 80%, 90% and 100%, for a given ambient temperature. Note that for the load L of 100%, the pilot pressure drop has a maximum about −20° C.

As shown in FIG. 4, at an ambient temperature of 50° C. and at 100% load, a normalised fuel flow is 1.16 units. In contrast, at an ambient temperature of −20° C. and at 100% load, the normalised fuel flow 1.87 units. This is significant change, being about a 61% increase in fuel flow.

However, it is advantageous to keep the turbine inlet temperature TI constant and/or limited, to avoid damage to metal components of the gas turbines. Hence, to keep the turbine inlet temperature TI constant and allow the gas turbines to produce more power at relatively colder temperatures and hence mass flow rates of air, more fuel is supplied to the gas turbines. Typically, as described above, the gas turbines may comprise a plurality of fuel streams and a pilot fuel stream may be required to keep flame stability and/or to keep flames lit. Hence, pilot fuel (also known as primary fuel) may be added into a combustion zone where the pilot fuel and air mixture burns in a diffusion mode. Typically, the pilot fuel represents a small percentage of the fuel, with the remainder of the fuel diverted into secondary and/or tertiary fuel streams. However, combustion of the pilot fuel may adversely affect NOx emissions.

The conventional methods of reducing NOx emissions at the lower temperatures, for example TETs, and/or at the lower fuel to air ratios result in reduction of thermodynamic efficiency and/or power output of the gas turbines. This is contrary to a typical goal of increasing thermodynamic efficiency. Further, such conventional methods of reducing NOx emissions are typically concerned with operating the gas turbines at full loads. In addition, known pilot fuel control algorithms for lower loads provide limited control of combustion dynamics, for example metal temperature, flame stability, and/or emissions. Furthermore, flame stability and/or emissions may be influenced by complex interplay between environmental and operating conditions, together with gas turbine specific factors such as age and contamination.

Hence, there is a need to improve control of gas turbines to improve metal temperature, flame stability and/or emissions.

SUMMARY OF THE INVENTION

It is one aim of the present invention, amongst others, to provide a controller for a gas turbine, a gas turbine comprising such a controller and a method of controlling such a gas turbine that improves metal temperature, flame stability and/or emissions, for example at lower temperatures and/or lower loads.

According to a first aspect, there is provided a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the controller is arranged to control a proportion P of the fuel flow rate FF supplied via the first fuel supply means based, at least in part, on the fuel flow rate FF.

According to a second aspect, there is provided a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the gas turbine comprises a controller arranged to control a proportion P of the fuel flow rate FF supplied via the first fuel supply means based, at least in part, on the fuel flow rate FF.

According to a third aspect, there is provided a method of controlling a gas turbine arranged to supply a load L, the gas turbine comprising a fuel supply means arranged to supply fuel at a fuel flow rate FF to a combustor, wherein the fuel supply means comprises a first fuel supply means and a second fuel supply means, the method comprising: controlling a proportion P of the fuel flow rate FF supplied via the first fuel supply means based, at least in part, on the fuel flow rate FF; whereby a metal temperature and/or an emission is improved.

According to a fourth aspect, there is provided a tangible non-transient computer-readable storage medium having recorded thereon instructions which when implemented by a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, cause the controller to perform a method of controlling the gas turbine, the method according to the third aspect.

According to a fifth aspect, there is provided a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the controller is arranged to: determine one or more ratios R of one or more combustor operating parameters COP respectively at the load L to respective reference combustor operating parameters COPR at a reference load LR; and control a proportion P of the fuel flow rate FF supplied via the first fuel supply means based, at least in part, on the determined one or more ratios R.

According to a sixth aspect, there is provided a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the gas turbine comprises a controller arranged to: determine one or more ratios R of one or more combustor operating parameters COP respectively at the load L to respective reference combustor operating parameters COPR at a reference load LR; and control a proportion P of the fuel flow rate FF supplied via the first fuel supply means based, at least in part, on the determined one or more ratios R.

According to a seventh aspect, there is provided a method of controlling a gas turbine arranged to supply a load L, the gas turbine comprising a fuel supply means arranged to supply fuel at a fuel flow rate FF to a combustor, wherein the fuel supply means comprises a first fuel supply means and a second fuel supply means, the method comprising: determining one or more ratios R of one or more combustor operating parameters COP respectively at the load L to respective reference combustor operating parameters COPR at a reference load LR; and controlling a proportion P of the fuel flow rate FF supplied via the first fuel supply means based, at least in part, on the determined one or more ratios R; whereby a flame stability and/or an emission is improved.

According to an eighth aspect, there is provided a tangible non-transient computer-readable storage medium having recorded thereon instructions which when implemented by a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, cause the controller to perform a method of controlling the gas turbine, the method according to the seventh aspect and/or the third aspect.

According to the present invention there is provided a controller for a gas turbine, as set forth in the appended claims. Also provided is a gas turbine, a method of controlling a gas turbine and a tangible non-transient computer-readable storage medium. Other features of the invention will be apparent from the dependent claims, and the description that follows.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

According to the first aspect, there is provided a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the controller is arranged to control a proportion P of the fuel flow rate FF supplied via the first fuel supply means based, at least in part, on the fuel flow rate FF.

By controlling the proportion P (i.e. a split) of the fuel flow rate FF supplied via the first fuel supply means based, at least in part, on the fuel flow rate FF, control of the gas turbine may be improved so as to improve a metal temperature and/or an emission, as the load L is varied for example. This improvement is particularly observed at high loads, for example >90%, and/or at higher temperatures, as described below.

Controlling the proportion P in this way may be applied, for example, as modifications to conventional pilot fuel control algorithms, to calculate and apply pilot split offsets for conventional pilot split maps for each load L and/or to split map envelopes, based, at least in part, on the fuel flow rate FF.

By improving metal temperature, reliability of the gas turbine may be improved. By improving emissions, for example reducing NOx emissions, environmental impact may be improved.

The inventors have determined that ambient variations may have a significant effect on NOx emissions and/or on metal temperatures in the pilot region where fuel is burnt rich for flame stability. That is, NOx emissions may be a function of TFIRE which depends on the air and fuel properties e.g. temperature, pressure, massflow etc. NOx emissions also depend on the pilot fuel percentage. Fine balancing of pilot fuel percent is required as lower pilot fuel results in poor flame stability and higher pilot fuel results in higher NOx emissions.

In another embodiment, if TFIRE>1550 K, the pilot split demand (proportion P)

$$P=XX/\text{Total Fuel Demand/Number of combustion cans}$$

Where XX is the desired fuel flow in one combustor through the pilot (nozzle) and given in kilowatts (KW). Otherwise, the pilot split demand is as per original pilot split map. The fundamental difference in this embodiment is that the algorithm is converted from Kg/sec to use kilowatts. Using massflow (Kg/sec) requires the use of flow meters to measure the fuel flow(s) and inherently there is a time delay before adjusting the pilot split fuel flow. In this way however, the control system response will be faster and more accurate compared to using massflow during transient operation.

Conventional control methods of gas turbines do not consider all these factors, being typically based on pilot percent (percentage of the total fuel) and, as described previously, used to keep the flame stable.

The inventors have determined that NOx emissions may be a strong function of pilot percent using gas and/or liquid fuel. When the fuel flow rate increases at relatively colder temperatures, the pilot fuel flow rate into the primary combustion zone also increases conventionally, as described above. Further, NOx emissions may change due to volumetric heat release and/or generation. For example, at relatively colder temperatures, heat release may be relatively higher if higher amounts of pilot fuel flow (at a same percent pilot split) are present in a stability region, which is often a vortex core region, of the combustor. Hence, a percentage pilot split as a function of a combustor exit temperature TX or a turbine inlet temperature TI may not account for NOx emissions and/or metal temperatures.

The gas turbine may be as described with respect to FIGS. 1 to 3.

In one example, the combustor comprises and/or is a can, annular or cannular combustor. In one example, the gas turbine includes a plurality of combustors. In one example, the first fuel supply means comprises and/or is a pilot fuel supply means. In one example, the first fuel supply means is a single pilot fuel supply means. In one example, the second fuel supply means comprises and/or is a main fuel supply means. In one example, the gas turbine comprises a plurality of combustors, the first fuel supply means comprises a plurality of pilot fuel supply means, for example corresponding and/or respective pilot fuel supply means, and the second fuel supply means comprises a plurality of main fuel supply means, for example corresponding and/or respective main fuel supply means. In other words, each combustor may include a pilot fuel nozzle and a main fuel nozzle associated with the first fuel supply means and the second fuel supply means respectively. In one example, the fuel is a gas fuel, for example natural gas. In one example, the fuel is a liquid fuel, for example fuel oil. For gas fuel, instead of a pilot pressure drop as described herein, a pressure ratio across the pilot fuel nozzle may be more important. Generally, a pressure ratio should be such that there is no reverse flow and/or high combustor to combustor variation.

It should be understood that the fuel flow rate FF is the total fuel flow rate FF. That is, the fuel flow rate FF includes that fuel supplied to the combustor via the first fuel supply means and a second fuel supply means. For example, if the gas turbine includes a plurality of combustors, the fuel flow rate FF includes that fuel supplied to the plurality of combustors via the first fuel supply means and a second fuel supply means. In one example, the fuel flow rate FF is determined by the load L. That is, if the load L changes, the fuel flow rate FF may change accordingly.

In one example, the gas turbine comprises one or more sensors arranged to sense, for example measure, the fuel flow rate FF and/or the load L and the controller is arranged to obtain the measured the fuel flow rate FF and/or the load L therefrom.

In one example, the controller is arranged to control the proportion P of the fuel flow rate FF supplied via the first fuel supply means based, at least in part, on a reference fuel flow rate FFR.

In one example, the reference fuel flow rate FFR is at a first predetermined temperature T1, advantageously 323 K of inlet air temperature to the gas turbine, and/or a first predetermined load L1, advantageously 100%.

In one example, the controller is arranged to control the proportion P of the fuel flow rate FF supplied via the first fuel supply means based, at least in part, on a reference proportion PR of the fuel flow rate FF supplied via the first fuel supply means.

In one example, the controller is arranged to control the proportion P of the fuel flow rate FF supplied via the first fuel supply means based, at least in part, on a reference proportion PR of the fuel flow rate FF supplied via the first fuel supply means.

In one example, the controller is arranged to control the proportion P of the fuel flow rate FF supplied via the first fuel supply means based, at least in part, on a reference proportion PR of the fuel flow rate FF supplied via the first fuel supply means.

Additionally and/or alternatively, the proportion P of the fuel flow rate FF supplied via the first fuel supply means may be described by equation 1 below as:

$$\text{Proportion } P = \frac{\text{Scaling Constant } SC}{\text{Fuel Flow Rate } FF}$$

where

Scaling Constant SC=Reference Fuel Flow Rate FFR×Reference Proportion PR

In one example, the reference proportion PR is at a first predetermined temperature T1, advantageously 323 K, and/or a first predetermined load L1, advantageously 100%.

In one example, the reference proportion PR is a pilot percentage as a function of a turbine inlet temperature TI.

In one example, the reference proportion PR is based, at least in part, on minimum fuel flow rate below which liquid spray cone from a fuel supply means nozzle, for example the first fuel supply means nozzle, collapses.

In one example, the reference proportion PR is based, at least in part, on a minimum fuel flow rate below which there is no positive and/or net flow into the combustor via a fuel supply means nozzle, for example the first fuel supply means nozzle.

In this way, the proportion P of the fuel flow rate FF supplied via the first fuel supply means based, at least in part, on the fuel flow rate FF considers, for example, physics of a liquid fuel spray pressure drop and/or a gas fuel pressure ratio. For example, if the pressure drop is too low, variation between combustors may be significant, with different combustion zones having different fuel flow rates, making it difficult to control the gas turbine in such weak fuel flows. For example, for a liquid spray pressure drop from pressure swirl injectors or nozzles, a minimum required pressure drop may be 0.5 bar. For a gas fuel, a minimum required pressure ratio may be 1.005 or a 0.5% pressure drop.

In one example, the reference proportion PR of the fuel flow rate FF supplied via the first fuel supply means is at a second predetermined temperature T2, advantageously 323 K, and/or a second predetermined load L2, advantageously 100%.

Advantageously, the second predetermined temperature T2 may be the gas temperature at the exit of the compressor. This second predetermined temperature T2 will be higher than compressor inlet temperature or in general greater than 323 K since compressor work will be added to the fluid at the exit and therefore the temperature will be higher than 323 K.

In one example, the proportion P of the fuel flow rate FF supplied via the first fuel supply means is determined by P=(FFR*PR)/FF.

In one example, the reference fuel flow rate FFR is at the first predetermined temperature T1 and/or the first predetermined load L1 and/or the reference proportion PR is at the second predetermined temperature T2 and/or the second predetermined load L2.

In one example, the first predetermined temperature T1 and the second predetermined temperature T2 are the same (i.e. equal). In one example, the first predetermined load L1 and the second predetermined load L2 are the same (i.e. equal).

In one example, the controller is arranged to control the fuel flow rate FF based, at least in part, on the ambient temperature TA.

In one example, the gas turbine comprises one or more sensors arranged to sense, for example measure, an ambient temperature TA and the controller is arranged to obtain the measured ambient temperature TA therefrom.

In one example, the controller is arranged to control the proportion P of the fuel flow rate F supplied via the first fuel supply means based, at least in part, on the fuel flow rate FF if a combustor exit temperature TX is greater than a third predetermined temperature T3 and/or if a turbine inlet temperature TI is greater than a fourth predetermined temperature T4.

In one example, the gas turbine comprises one or more sensors arranged to sense, for example measure, a combustor exit temperature TX and/or a turbine inlet temperature TI and the controller is arranged to obtain the measured combustor exit temperature TX and/or the measured turbine inlet temperature TI therefrom.

In one example, the third predetermined temperature T3 is in a range from about 1400 K to 1900 K, advantageously in a range of from about 1500 K to 1700 K, more advantageously in a range of from about 1550 K to 1650 K.

In one example, the fourth predetermined temperature T4 is in a range from about 1400 K to 1900 K, advantageously in a range of from about 1500 K to 1700 K, more advantageously in a range of from about 1550 K to 1650 K.

The fourth predetermined temperature T4 may depend on a particular design of the combustor.

In this way, the control of the proportion P of the fuel flow rate FF supplied via the first fuel supply means based, at least in part, on the fuel flow rate FF is at temperatures where thermal NOx emissions are dominant and/or when metal tip temperatures are a concern. At temperatures higher than T3 and/or T4, the fuel flow rate FF supplied via the first fuel supply means is at least a minimum value such that NOx emissions may be reduced across the ambient temperature range and/or metal temperatures in the vicinity of a pilot zone may be reduced, improving reliability and/or leading to higher component life.

A minimum required pressure drop for a reasonable spray is assumed to be at an ambient temperature of 50° C. and at a load L of 100%. Below this fuel flow rate FF, there may be a relatively higher combustor to combustor variation. According to the control provided by the first aspect, a pilot split map may be changed while maintaining a reasonable pressure drop.

According to the control provided by the first aspect, a pilot split map may be changed based on the turbine inlet temperature TI while ensuring that a 50° C. ambient temperature and a load L of 100% is the worst condition or limiting condition at which a scaling factor is calculated. In this way, control of the gas turbine may be readily implemented.

According to the control provided by the first aspect, differences with respect to at least NOx emissions between site testing and actual operating conditions upon installation on site, for example at relatively colder ambient temperatures and/or 100% load on site, may be reduced.

In one example, the controller is arranged to control the proportion P of the fuel flow rate FF supplied via the first fuel supply means to be a constant, if the combustor exit temperature TX is at most the third predetermined temperature T3.

In one example, the controller comprises a memory and a processor, wherein the memory includes instructions which when executed by the processor, cause the controller to perform a method of controlling the gas turbine as described herein, for example as described above and/or according to the third aspect. In one example, the controller comprises a communication unit, arranged to communicate with one or more sensors, as described above. In one example, the controller comprises a storage, arranged to store one or more predetermined loads, for example the first predetermined load L1, and/or predetermined temperatures, for example the first predetermined temperature T1, the second predetermined temperature T2, the third predetermined temperature T3 and/or the fourth predetermined temperature T4, as described above.

According to the second aspect, there is provided a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the gas turbine comprises a controller arranged to control a proportion P of the fuel flow rate FF supplied via the first fuel supply means based, at least in part, on the fuel flow rate FF.

The gas turbine, the load L, the fuel supply means, the fuel flow rate FF, the combustor, the first fuel supply means, the second fuel supply means, the controller, and/or the proportion P may be as described with respect to the first aspect.

According to the third aspect, there is provided a method of controlling a gas turbine arranged to supply a load L, the gas turbine comprising a fuel supply means arranged to supply fuel at a fuel flow rate FF to a combustor, wherein the fuel supply means comprises a first fuel supply means and a second fuel supply means, the method comprising: controlling a proportion P of the fuel flow rate FF supplied via the first fuel supply means based, at least in part, on the fuel flow rate FF; whereby a metal temperature and/or an emission is improved.

The gas turbine, the load L, the fuel supply means, the fuel flow rate FF, the combustor, the first fuel supply means, the second fuel supply means, the controller, and/or the proportion P may be as described with respect to the first aspect and/or the second aspect. The emission may be, for example, a NOx emission.

In one example, the controlling the proportion P of the fuel flow rate FF supplied via the first fuel supply means is based, at least in part, on a reference fuel flow rate FFR.

In one example, the reference fuel flow rate FFR is at a first predetermined temperature T1, advantageously 323 K, and/or a first predetermined load L1, advantageously 100%.

In one example, the controlling the proportion P of the fuel flow rate FF supplied via the first fuel supply means is based, at least in part, on a reference proportion PR of the fuel flow rate FF supplied via the first fuel supply means.

In one example, the reference proportion PR of the fuel flow rate FF supplied via the first fuel supply means is at a second predetermined temperature T2, advantageously 323 K, and/or a second predetermined load L2, advantageously 100%.

In one example, method comprises controlling the proportion P of the fuel flow rate FF supplied via the first fuel supply means based, at least in part, on a reference proportion PR of the fuel flow rate FF supplied via the first fuel supply means.

In one example, the reference proportion PR is at a first predetermined temperature T1, advantageously 323 K, and/or a first predetermined load L1, advantageously 100%.

In one example, the reference proportion PR is a pilot percentage as a function of a turbine inlet temperature TI.

In one example, the reference proportion PR is based, at least in part, on minimum fuel flow rate below which liquid spray cone from a fuel supply means nozzle, for example the first fuel supply means nozzle, collapses.

In one example, the reference proportion PR is based, at least in part, on a minimum fuel flow rate below which there is no positive and/or net flow into the combustor via a fuel supply means nozzle, for example the first fuel supply means nozzle.

In one example, the proportion P of the fuel flow rate FF supplied via the first fuel supply means is determined by $P=(FFR*PR)/FF$.

In one example, the reference fuel flow rate FFR is at the first predetermined temperature T1 and/or the first predetermined load L1 and/or the reference proportion PR is at the second predetermined temperature T2 and/or the second predetermined load L2.

In one example, the method comprises measuring an ambient temperature TA and wherein the fuel flow rate FF is based, at least in part, on the ambient temperature TA.

In one example, the method comprises measuring a combustor exit temperature TX and/or a turbine inlet temperature TI and wherein the controlling the proportion P of the fuel flow rate F supplied via the first fuel supply means based, at least in part, on the fuel flow rate FF if the combustor exit temperature TX is greater than a third predetermined temperature T3 and/or if the turbine inlet temperature TI is greater than a fourth predetermined temperature T4.

In one example, the third predetermined temperature T3 is in a range from about 1400 K to 1900 K, advantageously in a range of from about 1500 K to 1700 K, more advantageously in a range of from about 1550 K to 1650 K.

In one example, if the combustor exit temperature TX is at most the third predetermined temperature T3, the proportion P of the fuel flow rate FF supplied via the first fuel supply means is constant.

In one example, the controlling the proportion P of the fuel flow rate FF supplied via the first fuel supply means is based, at least in part, on demanded kilowatts.

In one example, the gas turbine comprises a compressor and the second predetermined temperature T2 is a gas temperature at the exit of the compressor.

The first predetermined temperature T1 may be an ambient temperature.

The second predetermined temperature T2 may be an ambient temperature.

According to the fourth aspect, there is provided a tangible non-transient computer-readable storage medium having recorded thereon instructions which when implemented by a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, cause the controller to perform a method of controlling the gas turbine, the method according to the third aspect.

According to the fifth aspect, there is provided a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the controller is arranged to: determine one or more ratios R of one or more combustor operating parameters COP respectively at the load L to respective reference combustor operating parameters COPR at a reference load LR; and control a proportion P of the fuel flow rate FF supplied via the first fuel supply means based, at least in part, on the determined one or more ratios R.

By controlling the proportion P (i.e. a split) of the fuel flow rate FF supplied via the first fuel supply means, for example a pilot fuel supply means, based, at least in part, on the determined one or more ratios R, the proportion P may be varied along a Turndown Control Temperature (TCT) line, for example a substantially constant TCT line, as the load L is varied, for example reduced from a full load L supplyable by the gas turbine. In this way, control of the gas turbine may be improved so as to improve flame stability and/or emissions, as the load L is varied for example.

Controlling the proportion P in this way may be applied, for example, as modifications to conventional pilot fuel control algorithms, to calculate and apply pilot split offsets for conventional pilot split maps for each load L and/or to split map envelopes, based, at least in part, on the determined one or more ratios R.

In this way, improved, for example more accurate, initial conditions for control of pilot splits (i.e. the proportion P) at each load L along the substantially constant TCT line may be provided, so as to achieve improved combustion performance in terms of flame stability and/or emissions. By improving flame stability, reliability of the gas turbine may be improved. By improving emissions, for example reducing NOx emissions, environmental impact may be improved.

For example, a conventional pilot split may be a predefined constant pilot split value along the constant TCT line as the load L is decreased.

In contrast, the proportion P (i.e. a pilot split according to the invention) is non constant along a constant TCT line as the load L is decreased, being controlled based, at least in part, on the determined one or more ratios R, as described above.

Particularly, the proportion P may increase linearly as the load L is increased along the TCT line, for example. At the low end of the constant TCT line, the proportion P may be less than the conventional pilot split and at the high end of the constant TCT line, the proportion P may tend towards and/or equal the conventional pilot split. At loads L below the low end of the constant TCT line, the proportion P may increase as a Turbine Entry Temperature (TET) is reduced, being less than but tending towards the conventional pilot split as the load L is reduced. At loads L above the high end of the constant TCT line, the proportion P may decrease as the TET is increased to the full load L, substantially equal to the conventional pilot split value. That is, the proportion P may be at most the conventional pilot split value for a given load L, and may be less than the conventional pilot split value for intermediate loads L, for example in a range from about 10% to 60% of the full load L.

The controller may be further arranged as described with respect to the first aspect. Advantageously, the first aspect may improve a metal temperature and/or an emission at higher loads L and/or temperatures, as described previously, while the fifth aspect may be improve a flame stability and/or an emission at intermediate loads L, thereby providing synergistic advantages.

In one example, there is provided a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the controller is arranged to: determine one or more ratios R of one or more combustor operating parameters COP respectively at the load L to respective reference combustor operating parameters COPR at a reference load LR; control a proportion P of the fuel flow rate FF supplied via the first fuel supply means based, at least in part, on the determined one or more ratios R; and wherein the controller is arranged to control the proportion P of the fuel flow rate FF supplied via the first fuel supply means based, at least in part, on the fuel flow rate FF.

The gas turbine may be as described with respect to FIGS. 1 to 3.

In one example, the combustor comprises and/or is a can, annular or cannular combustor. In one example, the gas turbine includes a plurality of combustors, for example such combustors. In one example, the first fuel supply means comprises and/or is a pilot fuel supply means. In one example, the first fuel supply means is a single pilot fuel supply means. In one example, the second fuel supply means comprises and/or is a main fuel supply means. In one example, the gas turbine comprises a plurality of combustors, the first fuel supply means comprises a plurality of pilot fuel supply means, for example corresponding and/or respective pilot fuel supply means, and the second fuel supply means comprises a plurality of main fuel supply means, for example corresponding and/or respective main fuel supply means. In other words, each combustor may include a pilot fuel nozzle and a main fuel nozzle associated with the first fuel supply means and the second fuel supply means respectively. In one example, the fuel is a gas fuel, for example natural gas. In one example, the fuel is a liquid fuel, for example fuel oil.

In one example, the reference load LR is a full load (i.e. 100% load L) supplyable by the gas turbine.

In one example, the combustor operating parameter COP is one selected from a group comprising a combustion intensity CI of the combustor, an equivalence ratio ER of the combustor and a combustor inlet function CIF of the combustor.

The inventors have determined that one or more of these combustor operating parameters COP may be particularly beneficial in improving a flame stability and/or an emission, for example a NOx emission.

In one example, the combustion intensity CI is determined based, at least in part, on a heat input HI to the gas turbine, a compressor exit pressure CEP of the gas turbine and/or a combustor volume CV of the combustor and the controller is arranged to: determine the combustion intensity CI; determine a first ratio R1 of the combustion intensity CI at the load L to a reference combustion intensity CIR at the reference load LR; and control the proportion P of the fuel flow rate FF supplied via the first fuel supply means based, at least in part, on the determined first ratio R1.

In one example, the reference load LR is a full load supplyable by the gas turbine and the reference combustion intensity CIR at the reference load LR is the combustion intensity CIR at full load supplyable by the gas turbine.

In one example, the combustion intensity CI is determined by CI=HI/(CEP×CV) and the controller is arranged to determine the heat input HI, the compressor exit pressure CEP and/or the combustor volume CV.

The heat input HI may be derived based on the fuel flow rate FF, calorific value of the fuel and specific gravity of the fuel.

The compressor exit pressure CEP may be derived based on a gas turbine (engine) pressure ratio and/or may be measured.

The combustor volume CV may be measured/determined based on geometric measurements of the combustion system, for example, (prechamber+can+tduct).

In more detail, the combustion intensity CI may be determined by Equation 1 below as:

$$\text{Combustion Intensity } CI \text{ (MW/bar} \cdot m^3) = \frac{\text{Heat Input to Gas Turbine } HI \text{ (MW)}}{\text{Compressor Exit Pressure } CEP \text{ (bar} \cdot a) \times \text{Combustor Volume } CV \text{ } (m^3)}$$

In one example, the gas turbine includes a plurality of combustors and the combustor volume CV is the total combustor volume CV of the plurality of combustors. In one example, the combustor volume is predetermined, for example by measurement, and the controller is arranged to store the combustor volume CV.

In one example, the gas turbine comprises one or more sensors arranged to sense the heat input HI and/or the compressor exit pressure CEP and the controller is arranged to obtain the sensed the heat input HI and/or the compressor exit pressure CEP therefrom.

In one example, the equivalence ratio ER (also known as Φ) is determined based, at least in part, on the fuel flow rate FF to the combustor, an air flow rate FA to the combustor and/or a stoichiometric fuel to air ratio SFAR and wherein the controller is arranged to: determine the equivalence ratio ER; determine a second ratio R2 of the equivalence ratio ER at the load L to a reference equivalence ratio ERR at the reference load LR; and control the proportion P of the fuel flow rate FF supplied via the first fuel supply means based, at least in part, on the determined second ratio R2.

In one example, the equivalence ratio ER is determined by ER=(FF/FA)/SFAR and wherein the controller is arranged to determine the fuel flow rate FF, the air flow rate FA and/or the stoichiometric fuel to air ratio SFAR.

The fuel flow rate FF may be determined, for example measured, using a flow meter, for example.

The air flow rate FA may be determined, for example computed, based on a compressor speed and an engine pressure ratio.

The stoichiometric fuel to air ratio SFAR may be determined, for example calculated, as a value specific to a certain fuel composition and may be a theoretical value that implies that a reaction between carbon and oxygen constituents is completed without any excess of the former or latter, to achieve a complete consumption of both constituents. If more oxygen exists within the mixture, then the mixture is referred to as lean mixture. This is typical for gas turbines, for which reference to lean premixed systems is typically made. However, when an excess of fuel exist, then reference is made instead to rich systems, as also referred to for gas turbines, but not as often.

In more detail, the equivalence ratio ER may be determined by Equation 2 below as:

$$\text{Equivalence Ratio } ER = \frac{\text{Actual Fuel } FF : \text{Air } FA \text{ Ratio}}{\text{Stoichiometric Fuel} : \text{Air Ratio } SFAR}$$

where $$\text{Actual Fuel} : \text{Air Ratio} = \frac{\text{Mass Fuel Flow Rate (kg/s)}}{\text{Mass Air Flow Rate (kg/s)}}$$

In one example, the gas turbine comprises one or more sensors arranged to sense the fuel flow rate FF and/or the air flow rate FA and the controller is arranged to obtain the sensed fuel flow rate FF and/or the air flow rate FA therefrom.

In one example, the combustor inlet function CIF is determined based, at least in part, on an air flow rate FA to the combustor, a compressor exit temperature CET of the gas turbine and/or a compressor exit pressure CEP of the gas turbine and the controller is arranged to: determine the combustor inlet function CIF; determine a third ratio R3 of the combustor inlet function CIF at the load L to a reference combustor inlet function CIFR at the reference load LR; and control the proportion P of the fuel flow rate FF supplied via the first fuel supply means based, at least in part, on the determined third ratio R3.

In one example, the combustor inlet function CIF is determined by CIF=(FA×√CET)/CEP and the controller is arranged to determine the air flow rate FA, the compressor exit temperature CET and/or the compressor exit pressure CEP.

The air flow rate FA may be determined, for example computed, based on a compressor speed and an engine (i.e. gas turbine) pressure ratio.

The compressor exit temperature CET may be determined, for example measured, by thermocouples and/or may be derived based on engine (i.e. gas turbine) pressure ratio.

The compressor exit pressure CEP may be determined, for example derived, based on engine pressure ratio and/or may be measured.

In more detail, the combustor inlet function CIF may be determined by Equation 3 as:

$$\text{Combustor Inlet Function } CIF = \frac{\text{Mass Air Flow Rate (kg/s)} \times \sqrt{\text{Compressor Exit Temperature } CET \text{ (K)}}}{\text{Compressor Exit Pressure } CEP \text{ (bar} \cdot a)}$$

In one example, the gas turbine comprises one or more sensors arranged to sense the air flow rate FA, the compressor exit temperature CET and/or the compressor exit pressure CEP and the controller is arranged to obtain the sensed air flow rate FA, the compressor exit temperature CET and/or the compressor exit pressure CEP therefrom.

In one example, controller is arranged to: determine a bleed flow rate FB; and control the proportion P of the fuel flow rate FF supplied via the first fuel supply means based, at least in part, on the determined bleed flow rate FB.

In one example, the gas turbine comprises one or more sensors arranged to sense the bleed flow rate FB and the controller is arranged to obtain the sensed bleed flow rate FB therefrom.

In one example, the bleed flow rate FB is a mass air flow rate to an exhaust and/or an inlet of the gas turbine.

In one example, the gas turbine comprises one or more sensors arranged to sense the mass air flow rate to an exhaust and/or an inlet of the gas turbine and the controller is arranged to obtain the sensed mass air flow rate to an exhaust and/or an inlet of the gas turbine therefrom.

In one example, the load L and/or the fuel flow rate FF and/or a Turbine Entry Temperature TET is substantially constant.

In one example, the gas turbine comprises one or more sensors arranged to sense the load L and/or the fuel flow rate FF and/or the Turbine Entry Temperature TET and the controller is arranged to obtain the sensed the load L and/or the fuel flow rate FF and/or the Turbine Entry Temperature TET therefrom.

In one example, the controller comprises a memory and a processor, wherein the memory includes instructions which when executed by the processor, cause the controller to perform a method of controlling the gas turbine as described herein, for example as described above and/or according to the seventh aspect and/or the third aspect. In other words, the controller may be arranged, for example, to determine the one or more ratios R of the one or more combustor operating parameters COP respectively at the load L to the respective reference combustor operating parameters COPR at the reference load LR, determine the combustor operating parameters COP as described above and/or control the proportion P of the fuel flow rate FF supplied via the first fuel supply means based, at least in part, on the determined one or more ratios R, according to the instructions executed by the processor. In one example, the controller comprises a communication unit, arranged to communicate with one or more sensors, as described above. In one example, the controller comprises a storage, arranged to store one or more than one or more ratios R of the one or more combustor operating parameters COP respectively at the load L, the respective reference combustor operating parameters COPR at the reference load LR, and/or the determined combustor operating parameters COP, as described above.

According to the sixth aspect, there is provided a gas turbine arranged to supply a load L, the gas turbine comprising a fuel supply means arranged to supply fuel at a fuel flow rate FF to a combustor, wherein the fuel supply means comprises a first fuel supply means and a second fuel supply means, wherein the gas turbine comprises a controller arranged to: determine one or more ratios R of one or more combustor operating parameters COP respectively at the load L to respective reference combustor operating parameters COPR at a reference load LR; and control a proportion P of the fuel flow rate FF supplied via the first fuel supply means based, at least in part, on the determined one or more ratios R.

The gas turbine, the load L, the fuel supply means, the fuel flow rate FF, the combustor, the first fuel supply means, the second fuel supply means, the controller, the ratios R, the combustor operating parameters COP, the reference combustor operating parameters COPR, the reference load LR and/or the proportion P may be as described with respect to the fifth aspect and/or the first aspect.

According to the seventh aspect, there is provided a method of controlling a gas turbine arranged to supply a load L, the gas turbine comprising a fuel supply means arranged to supply fuel at a fuel flow rate FF to a combustor, wherein the fuel supply means comprises a first fuel supply means and a second fuel supply means, the method comprising: determining one or more ratios R of one or more combustor operating parameters COP respectively at the load L to respective reference combustor operating parameters COPR at a reference load LR; and controlling a proportion P of the fuel flow rate FF supplied via the first fuel supply means based, at least in part, on the determined one or more ratios R; whereby a flame stability and/or an emission is improved.

The gas turbine, the load L, the fuel supply means, the fuel flow rate FF, the combustor, the first fuel supply means, the second fuel supply means, the controller, the ratios R, the combustor operating parameters COP, the reference combustor operating parameters COPR, the reference load LR and/or the proportion P may be as described with respect to the fifth aspect, the sixth aspect, the first aspect and/or the second aspect. The emission may be, for example, a NOx emission.

In one example, there is provided a method of controlling a gas turbine arranged to supply a load L, the gas turbine comprising a fuel supply means arranged to supply fuel at a fuel flow rate FF to a combustor, wherein the fuel supply means comprises a first fuel supply means and a second fuel supply means, the method comprising: determining one or more ratios R of one or more combustor operating parameters COP respectively at the load L to respective reference combustor operating parameters COPR at a reference load LR; controlling a proportion P of the fuel flow rate FF supplied via the first fuel supply means based, at least in part, on the determined one or more ratios R; and controlling the proportion P of the fuel flow rate FF supplied via the first fuel supply means based, at least in part, on the fuel flow rate FF; whereby a metal temperature and/or a flame stability and/or an emission is improved.

In one example, the combustor operating parameter COP is one selected from a group comprising a combustion intensity CI of the combustor, an equivalence ratio ER of the combustor and a combustor inlet function CIF of the combustor.

In one example, the combustion intensity CI is determined based, at least in part, on a heat input HI to the gas turbine, a compressor exit pressure CEP of the gas turbine and/or a combustor volume CV of the combustor and wherein the method comprises: determining the combustion intensity CI; determining a first ratio R1 of the combustion intensity CI at the load L to a reference combustion intensity CIR at the reference load LR; and controlling the proportion P of the fuel flow rate FF supplied via the first fuel supply means based, at least in part, on the determined first ratio R1.

In one example, the combustion intensity CI is determined by CI=HI/(CEP×CV) and wherein the method comprises determining the heat input HI, the compressor exit pressure CEP and/or the combustor volume CV.

In one example, the equivalence ratio ER is determined based, at least in part, on the fuel flow rate FF to the combustor, an air flow rate FA to the combustor and/or a stoichiometric fuel to air ratio SFAR and wherein the method comprises: determining the equivalence ratio ER; determining a second ratio R2 of the equivalence ratio ER at the load L to a reference equivalence ratio ERR at the reference load LR; and controlling the proportion P of the fuel flow rate FF supplied via the first fuel supply means based, at least in part, on the determined second ratio R2.

In one example, the equivalence ratio ER is determined by ER=(FF/FA)/SFAR and wherein the method comprises determining the fuel flow rate FF, the air flow rate FA and/or the stoichiometric fuel to air ratio SFAR.

In one example, the combustor inlet function CIF is determined based, at least in part, on an air flow rate FA to the combustor, a compressor exit temperature CET of the gas turbine and/or a compressor exit pressure CEP of the gas turbine and wherein the method comprises: determining the combustor inlet function CIF; determining a third ratio R3 of the combustor inlet function CIF at the load L to a reference combustor inlet function CIFR at the reference load LR; and controlling the proportion P of the fuel flow rate FF supplied via the first fuel supply means based, at least in part, on the determined third ratio R3.

In one example, the combustor inlet function CIF is determined by CIF=(FA×√CET)/CEP and wherein the method comprises determining the air flow rate FA, the compressor exit temperature CET and/or the compressor exit pressure CEP.

In one example, method comprises: determining a bleed flow rate FB; and controlling the proportion P of the fuel flow rate FF supplied via the first fuel supply means based, at least in part, on the determined bleed flow rate FB.

In one example, the load L and/or the fuel flow rate FF and/or a Turbine Entry Temperature TET is substantially constant.

In one example, the reference load LR is a full load supplyable by the gas turbine.

In one example, the first fuel supply means is a pilot fuel supply means.

According to the eighth aspect, there is provided a tangible non-transient computer-readable storage medium having recorded thereon instructions which when implemented by a controller for a gas turbine arranged to supply a load L, the gas turbine comprising a fuel supply means arranged to supply fuel at a fuel flow rate FF to a combustor, wherein the fuel supply means comprises a first fuel supply means and a second fuel supply means, cause the controller to perform a method of controlling the gas turbine, the method according to the seventh aspect and/or the third aspect.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION

Figure 1:
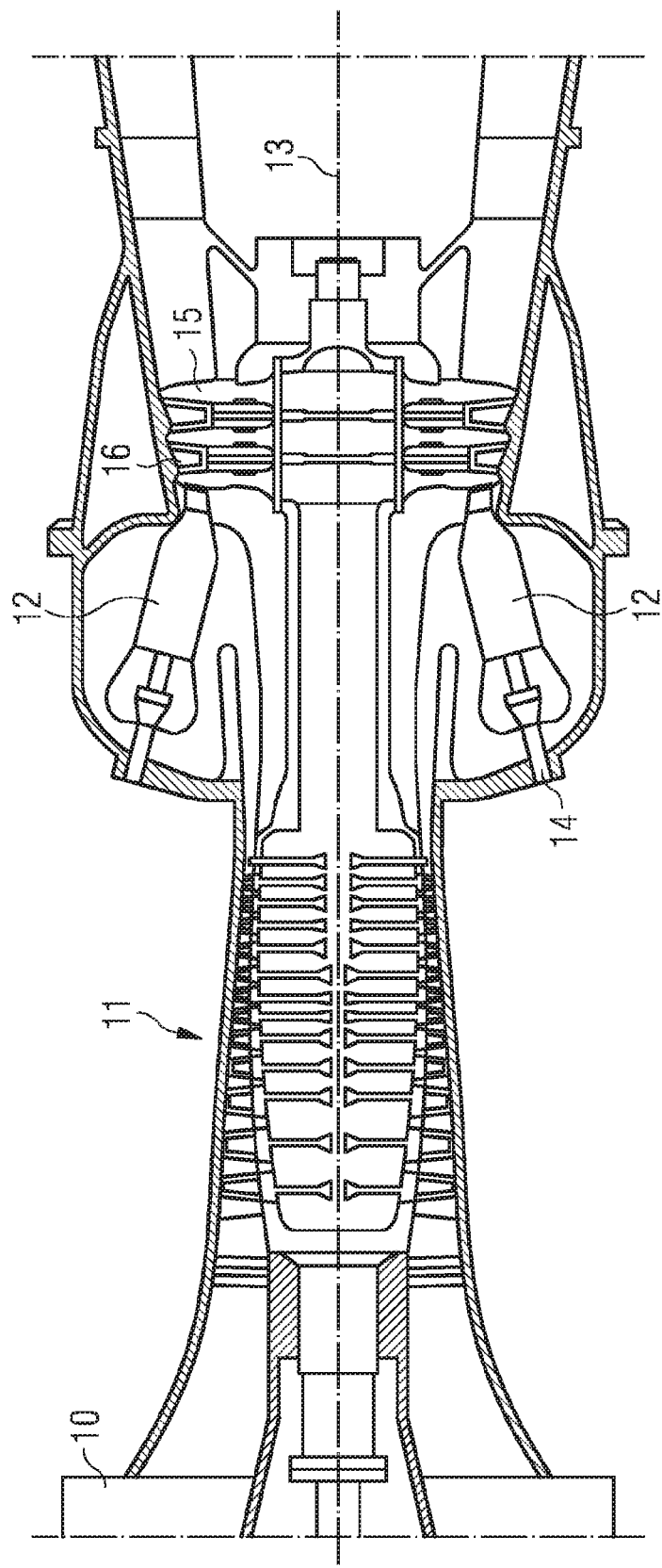
FIG. 1 schematically depicts a longitudinal section of a typical gas turbine.
Figure 2A:
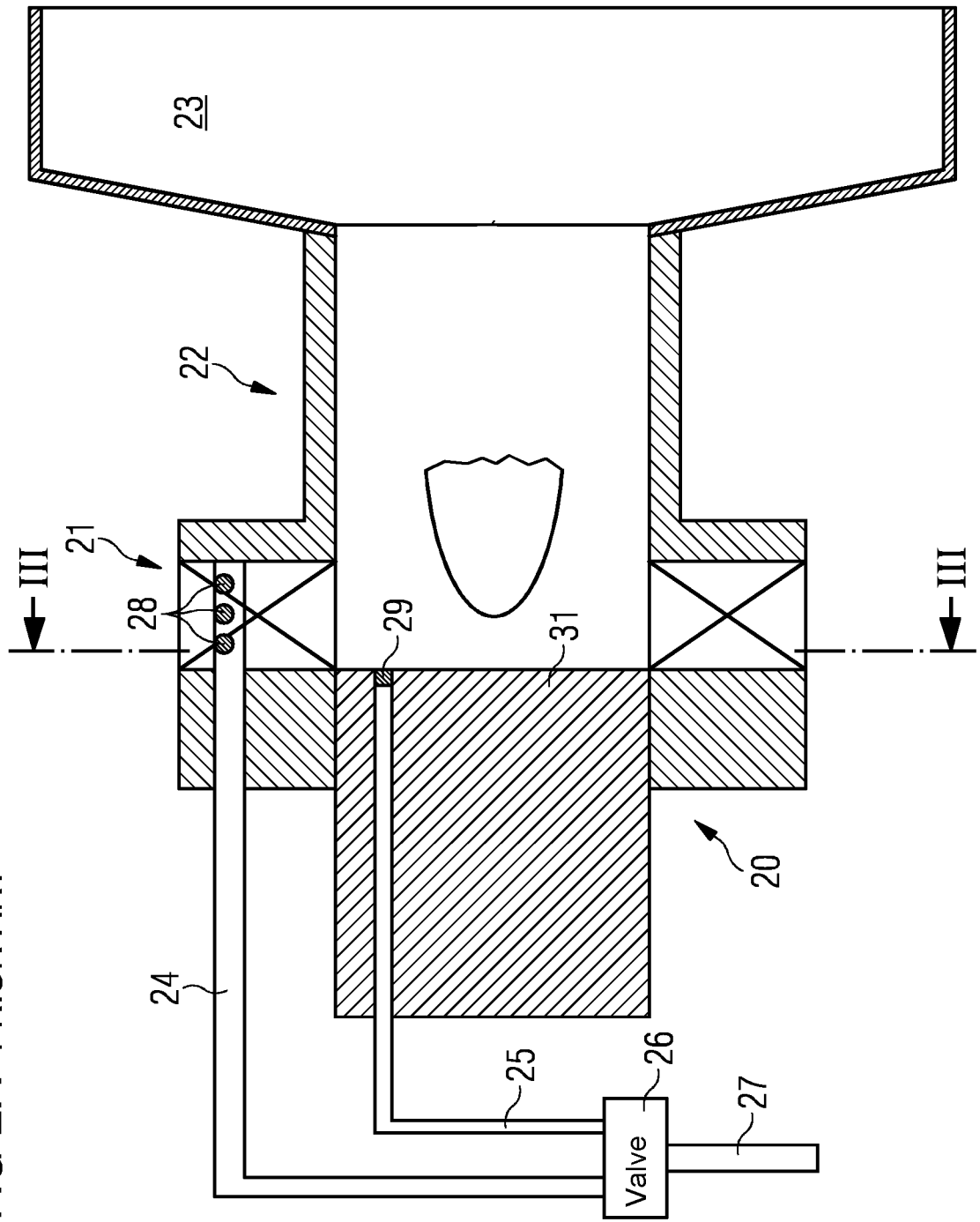
FIG. 2A schematically depicts a longitudinal section of a typical combustor and FIG. 2B schematically depicts a section along line III-III in FIG. 2A.
Figure 2B:
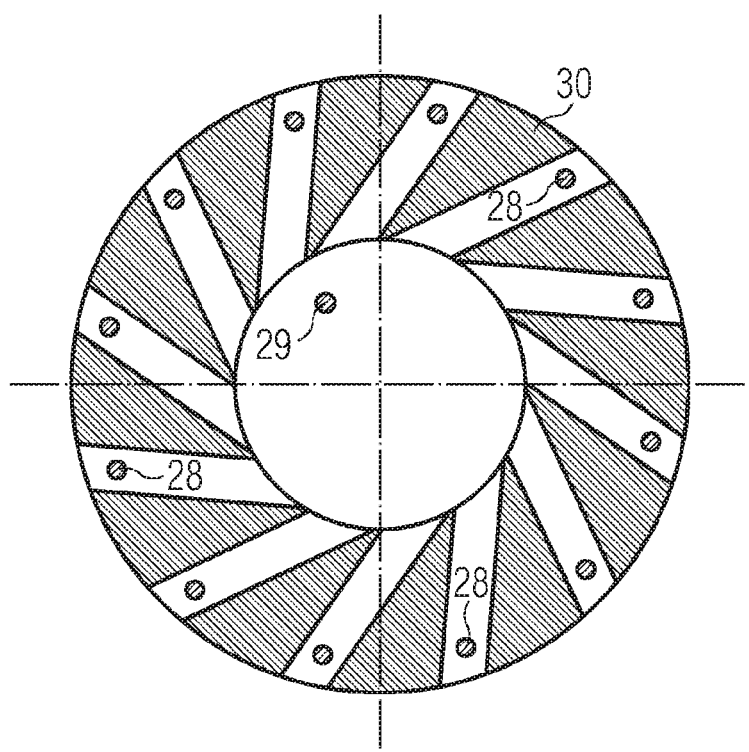
Figure 3:
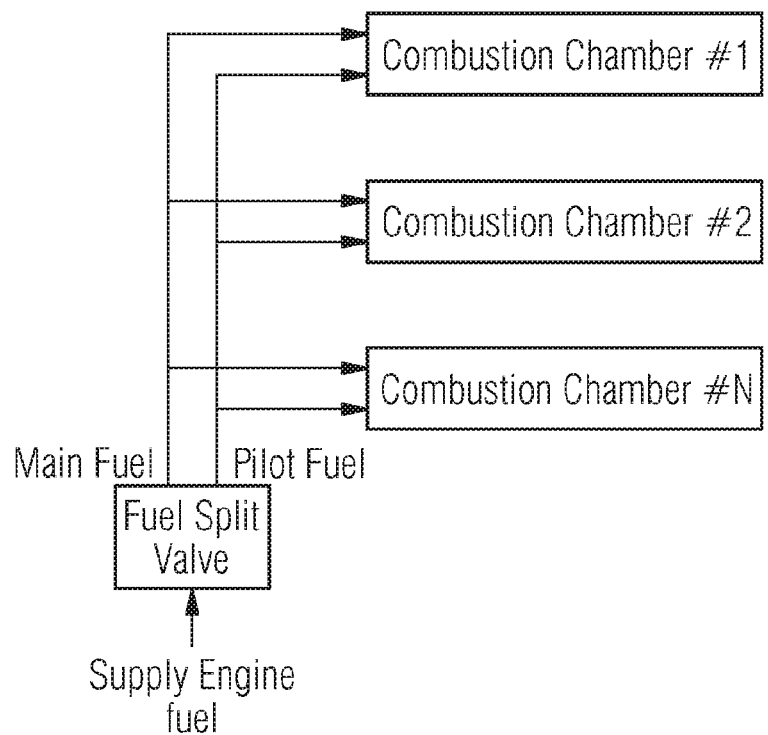
FIG. 3 schematically depicts a block diagram illustrating derivation of main and pilot fuel supplies in a typical gas turbine with multiple combustors.
Figure 4:
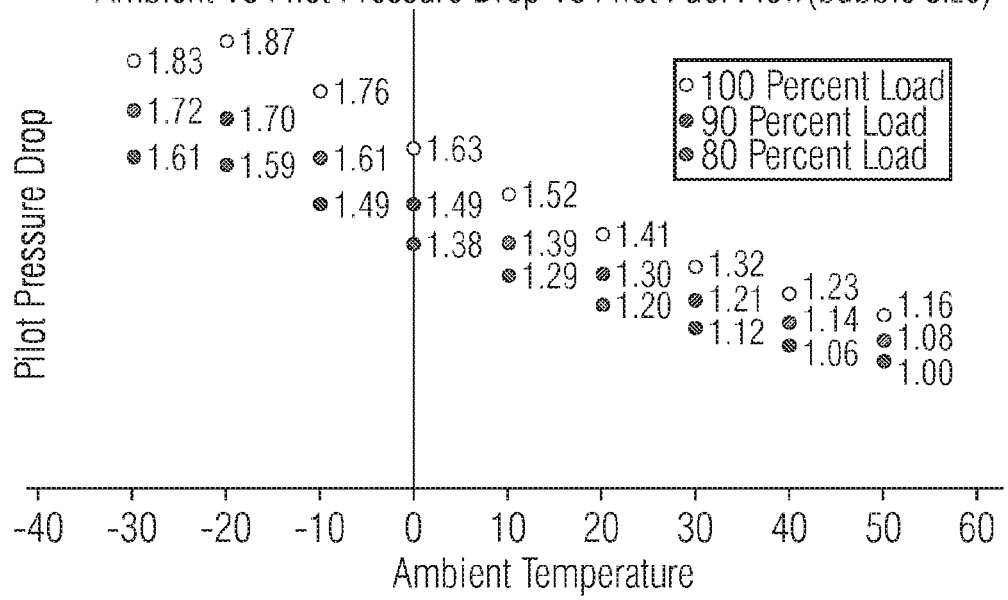
FIG. 4 shows a graph of a Pilot Pressure Drop across a pilot nozzle as a function of ambient temperature for different loads L for a typical gas turbine, normalised for an ambient temperature of 50° C. and a load L of 80%.
Figure 5:
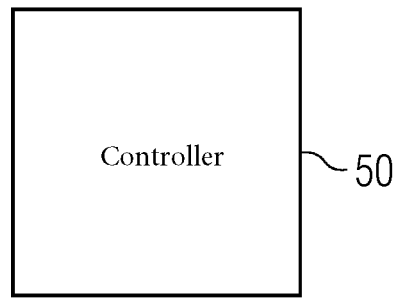
FIG. 5 schematically depicts a controller for a gas turbine according to an exemplary embodiment.

FIG. 5 schematically depicts a controller 50 for a gas turbine (not shown) according to an exemplary embodiment.

In more detail, the controller 50 is for a gas turbine arranged to supply a load L. The gas turbine comprises a fuel supply means arranged to supply fuel at a fuel flow rate FF to a combustor. The fuel supply means comprises a first fuel supply means and a second fuel supply means. The controller 50 is arranged to control a proportion P of the fuel flow rate FF supplied via the first fuel supply means based, at least in part, on the fuel flow rate FF.

The controller may be arranged as described previously.

Figure 6:
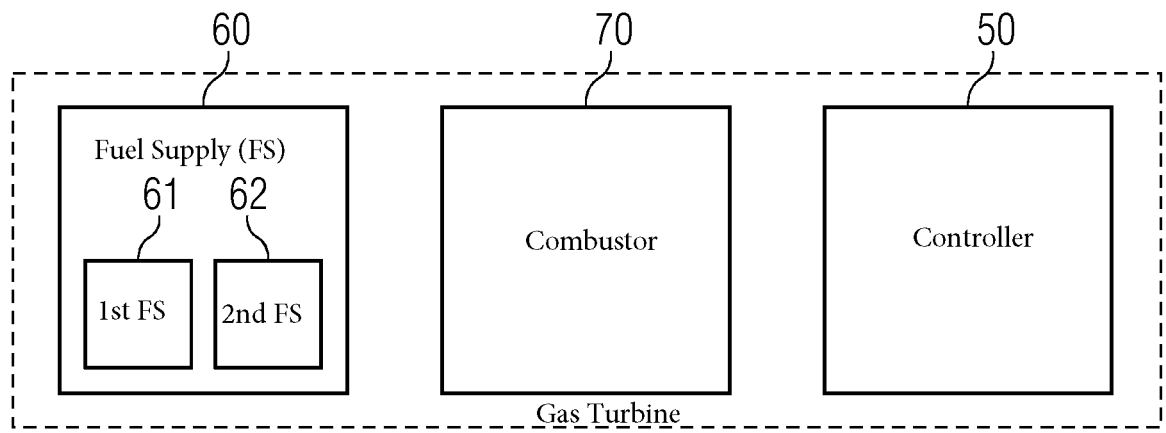
FIG. 6 schematically depicts a gas turbine according to an exemplary embodiment.

FIG. 6 schematically depicts a gas turbine 600 according to an exemplary embodiment.

In more detail, the gas turbine 600 is arranged to supply a load L. The gas turbine 600 comprises a fuel supply means 60 arranged to supply fuel at a fuel flow rate FF to a combustor 70. The fuel supply means 60 comprises a first fuel supply means 61 and a second fuel supply means 62. The gas turbine 600 comprises the controller 50, as described above with reference to FIG. 5. Particularly, the controller 50 is arranged to control a proportion P of the fuel flow rate FF supplied via the first fuel supply means 61 based, at least in part, on the fuel flow rate FF.

Figure 7:
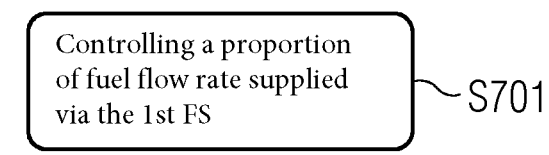
FIG. 7 schematically depicts a method of controlling a gas turbine according to an exemplary embodiment.

FIG. 7 schematically depicts a method of controlling a gas turbine according to an exemplary embodiment.

In more detail, the method is of controlling a gas turbine arranged to supply a load L, the gas turbine comprising a fuel supply means arranged to supply fuel at a fuel flow rate FF to a combustor, wherein the fuel supply means comprises a first fuel supply means and a second fuel supply means.

At S701, a proportion P of the fuel flow rate FF supplied via the first fuel supply means is controlled based, at least in part, on the fuel flow rate FF, whereby a metal temperature and/or an emission is improved.

The method may include any of the steps described previously.

As described above, controlling the proportion P in this way may be applied, for example, as modifications to conventional pilot fuel control algorithms, to calculate and apply pilot split offsets for conventional pilot split maps for each load L and/or to split map envelopes, based, at least in part, on the fuel flow rate FF.

Figure 8:
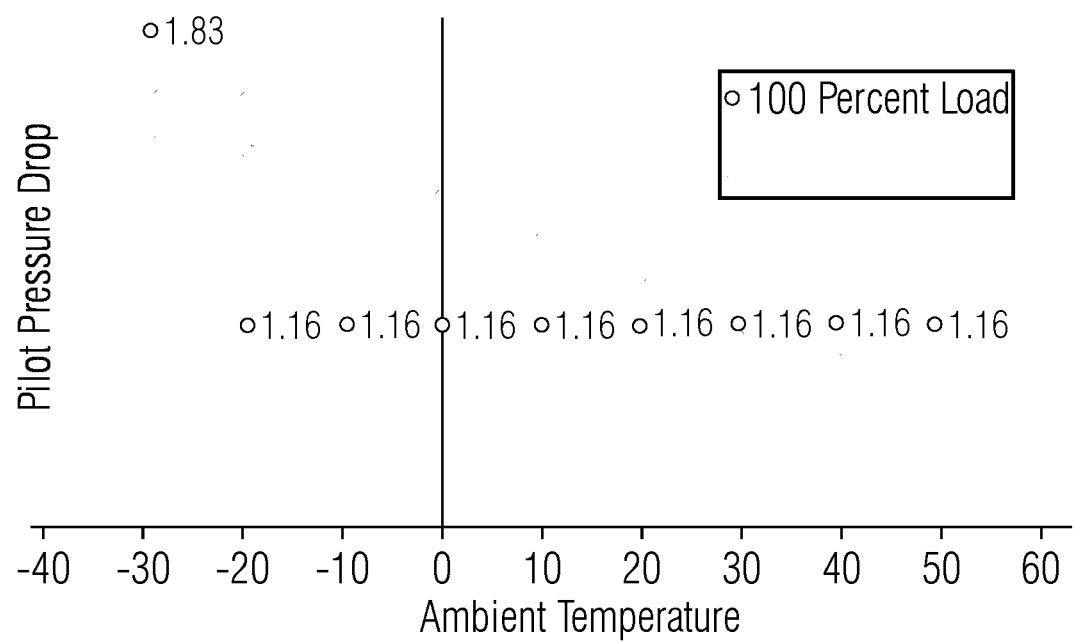
FIG. 8 shows a graph of a Pilot Pressure Drop across a pilot nozzle as a function of ambient temperature for a load L of 100% L for a typical gas turbine according to an exemplary embodiment.

FIG. 8 shows a graph of a Pilot Pressure Drop across a pilot nozzle as a function of ambient temperature for a load L at 100% for a typical gas turbine, normalised for an ambient temperature of 50° C. and a load L of 80%, according to an exemplary embodiment.

As shown in FIG. 8, for a load L of 100%, the pilot pressure drop is reduced to approximately by half for ambient temperatures from −20° C. to +50° C., which is the same value as at an ambient temperature of +50° C. With same pressure drop pilot fuel flow rate is also same which is shown as 1.16 unit across −20° C. to +50° C. For an ambient temperature of −30° C. and a load of 100%, the turbine inlet temperature TI is less than the fourth predetermined temperature T4 of about 1600 K and therefore, there is no change in the proportion P. In other words, the 100% load line is shifted such that fuel injector located at pilot where NOx is most sensitive receive lower fuel flow rate, thereby reducing tip temperature and/or NOx emissions. Although not shown in FIG. 8 it will be appreciated that similar operations e.g., in the case of liquid fuel, holding the pilot pressure drop constant regardless of ambient temperature variation) can be performed for other example loads L of the gas turbine, such as loads L of 80%, 90%, etc. of the gas turbine.

Although an embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method of controlling a gas turbine arranged to supply a load, the gas turbine comprising a fuel supply arranged to supply fuel at a fuel flow rate to a combustor, wherein the fuel supply comprises a first fuel supply and a second fuel supply, the method comprising:
    measuring an ambient temperature and providing the fuel flow rate based, at least in part, on the measured ambient temperature,
    measuring a combustion temperature,
    controlling a proportion of the fuel flow rate supplied via the first fuel supply based in part on the fuel flow rate in response to the measured combustion temperature exceeding a predetermined temperature,
    setting the proportion of the fuel flow rate supplied via the first fuel supply to be a constant in response to the measured combustion temperature being less than or equal to the predetermined temperature,
    wherein the fuel is gaseous fuel or liquid fuel, and
    wherein the proportion of the fuel flow rate supplied via the first fuel supply considers one of the following: a pressure drop in a spray of the liquid fuel and a pressure ratio of the gaseous fuel.

2. The method according to claim 1, wherein the controlling of the proportion of the fuel flow rate supplied via the first fuel supply is based, at least in part, on a reference fuel flow rate.

3. The method according to claim 2, wherein the reference fuel flow rate is at a first predetermined temperature, and/or a first predetermined load.

4. The method according to claim 1, wherein the controlling of the proportion of the fuel flow rate supplied via the first fuel supply is based, at least in part, on a reference proportion of the fuel flow rate supplied via the first fuel supply.

5. The method according to claim 4, wherein the reference proportion of the fuel flow rate supplied via the first fuel supply is at a second predetermined temperature, and/or a second predetermined load.

6. The method according to claim 4, wherein the proportion of the fuel flow rate supplied via the first fuel supply is determined by the following equation, $$P = (FFR * PR)/FF,$$

where P is indicative of the proportion of the fuel flow rate,
FF is indicative of the fuel flow rate,
FFR is indicative of the reference fuel flow rate, and
PR is indicative of the reference proportion of the fuel flow rate.

7. The method according to claim 5, wherein the reference fuel flow rate is at a first predetermined temperature and/or a first predetermined load.

8. The method according to claim 1, wherein the predetermined temperature is in a range from about 1400K to 1900K.

9. The method according to claim 1, wherein the first fuel supply is a pilot fuel supply.

10. The method according to claim 1, wherein the controlling of the proportion of the fuel flow rate supplied via the first fuel supply is based, at least in part, on demanded kilowatts.

11. The method according to claim 5, wherein the gas turbine comprises a compressor, wherein the second predetermined temperature is a gas temperature at the exit of the compressor.

12. The method according to claim 3, wherein the first predetermined temperature is the ambient temperature.

13. The method according to claim 5, wherein the second predetermined temperature is the ambient temperature.

14. The method according to claim 3, wherein the first predetermined temperature is 323K.

15. The method according to claim 5, wherein the second predetermined temperature is 323K.

16. The method according to claim 8, wherein the predetermined temperature is in a range from about 1500K to 1700K.

17. The method according to claim 8, wherein the predetermined temperature is in a range from about 1550K to 1650K.

18. The method according to claim 3, wherein the first predetermined load is 100%.

19. The method according to claim 2, wherein the reference fuel flow rate is at a first predetermined temperature, and at a first predetermined load, wherein the first predetermined temperature is 323K and the first predetermined load is 100%.

20. The method according to claim 5, wherein the second predetermined load is 100%.

21. The method according to claim 4, wherein the reference proportion of the fuel flow rate supplied via the first fuel supply is at a second predetermined temperature, and at second predetermined load, wherein the second predetermined temperature is 323K, and the second predetermined load is 100%.

22. The method according to claim 1, wherein the combustion temperature is a combustor exit temperature.

23. The method according to claim 1, wherein the combustion temperature is a turbine inlet temperature.

24. A tangible non-transient computer-readable storage medium for a controller of a gas turbine arranged to supply a load, the gas turbine comprising a fuel supply arranged to supply fuel at a fuel flow rate to a combustor, wherein the fuel supply comprises a first fuel supply and a second fuel supply, the tangible non-transient computer-readable storage medium having recorded instructions thereon, which when executed by the controller, cause the controller to perform the following:

measuring an ambient temperature and providing the fuel flow rate based, at least in part, on the measured ambient temperature, measuring a combustion temperature, controlling a proportion of the fuel flow rate supplied via the first fuel supply based in part on the fuel flow rate in response to the measured combustion temperature exceeding a predetermined temperature, setting the proportion of the fuel flow rate supplied via the first fuel supply to be a constant in response to the measured combustion temperature being less than or equal to the predetermined temperature, wherein the fuel is gaseous fuel or liquid fuel, and wherein the proportion of the fuel flow rate supplied via the first fuel supply considers one of the following: a pressure drop in a spray of the liquid fuel and a pressure ratio of the gaseous fuel.

* * * * *